Jan. 21, 1958     D. KNEELAND     2,820,519
DOUBLE HOLE PAPER DRILLING DEVICE
Filed Aug. 11, 1954     2 Sheets-Sheet 1
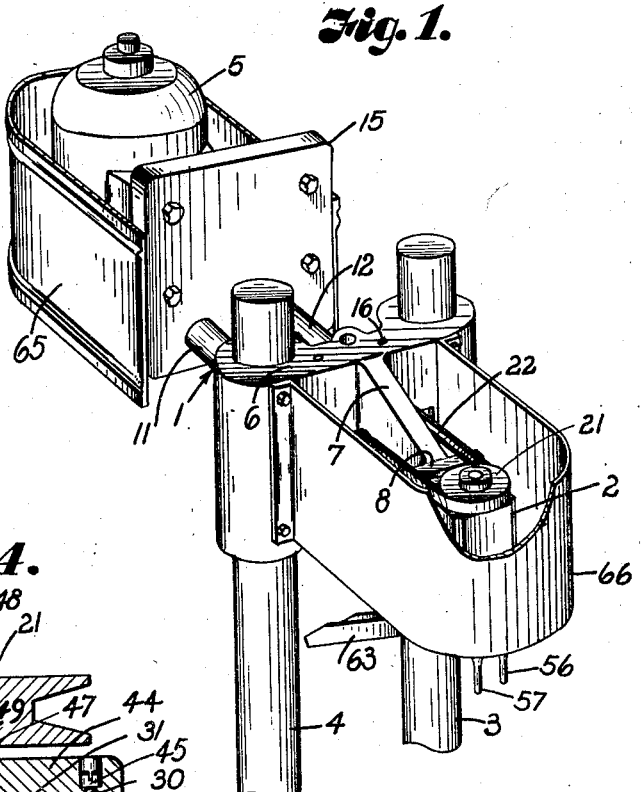
Fig. 1.
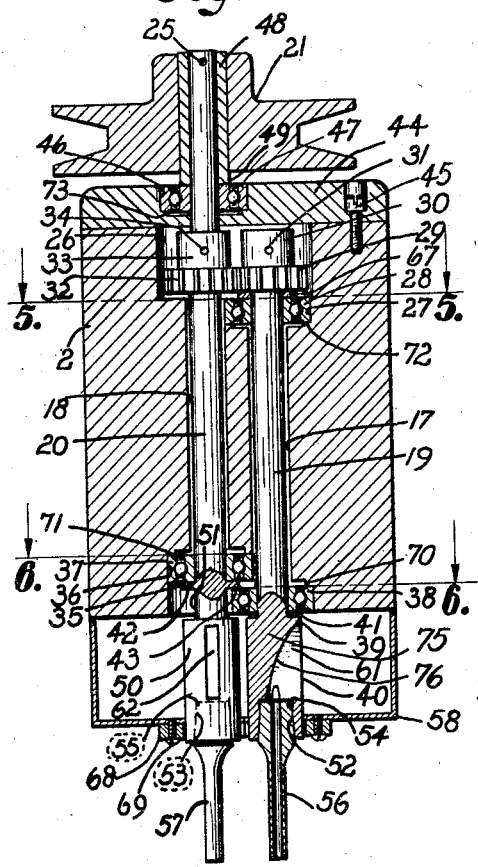
Fig. 4.
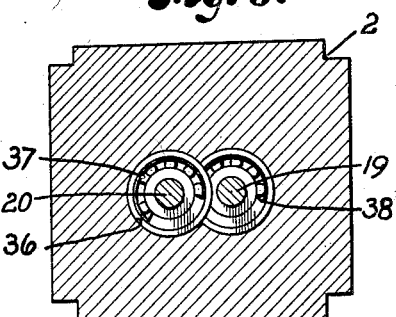
Fig. 6.
Fig. 7
INVENTOR.
DAVID KNEELAND.
BY
*Fishburn & Mullendore*
ATTORNEYS.

Jan. 21, 1958  D. KNEELAND  2,820,519
DOUBLE HOLE PAPER DRILLING DEVICE
Filed Aug. 11, 1954  2 Sheets-Sheet 2

INVENTOR.
DAVID KNEELAND.
BY
*Fishburn + Mullendore*
ATTORNEYS.

United States Patent Office 2,820,519
Patented Jan. 21, 1958

2,820,519

DOUBLE HOLE PAPER DRILLING DEVICE

David Kneeland, Hickman Mills, Mo., assignor to Hallmark Cards, Incorporated, Kansas City, Mo., a corporation of Missouri Application August 11, 1954, Serial No. 449,184

3 Claims. (Cl. 164—90)

This invention relates to a boring head and more particularly to a boring head having a plurality of shafts or spindles adapted to bore on closely related centers.

This invention is particularly adapted for boring of holes in paper, cardboard or the like for use in the greeting card industry and related use wherein holes are required to be in close relation for tying together with ribbon or the like.

Heretofore, there has been no machine available on the market having a plurality of shafts wherein the shafts could be close enough together for operating at high speed to bore holes in paper for the purpose intended.

It is, therefore, the principal object of the present invention to provide a boring head having a plurality of shafts or spindles provided with anti-friction bearings in offset relation on the shafts both at the top and bottom of the shafts so that the shafts may be rotated at high speed and maintain the shafts in axial alignment by the anti-friction bearings.

Other objects of the present invention are to provide a boring head with relatively few working parts so as to insure for long life of the device and the bearings being so arranged that little wear will occur while being driven at high speeds; to provide the bearings on one shaft at a different elevation with respect to those on the other shaft; to provide gears on one shaft meshing with gears on the other shaft for providing driving force for the other shaft; to provide means on the gears and bearings to take axial thrust as the drilling operation is being performed and to take the thrust during withdrawal of the drill from the paper stack; to provide means for carrying the chips of paper from the drills; and to provide a device of this character, simple and economical to manufacture.

In accomplishing these and other objects of the present invention, I have provided improved details of structure, the preferred forms of which are illustrated in the accompanying drawings, wherein:

Fig. 1 is a perspective view of our invention with parts broken away to better illustrate the structure.

Fig. 4 is a cross-sectional view particularly illustrating the shafts and the bearing mountings therefor.

Fig. 6 is a cross-sectional view taken on a line 6—6, Fig. 4.

Fig. 7 is a cross-sectional view through the lower end of one of the shafts illustrating the opening for carrying away chips of paper from the drill.

Referring more in detail to the drawings:

1 generally designates a device embodying the features of my invention comprising a head 2 carried by posts or uprights 3 and 4. 5 designates a motor mounted upon the posts 3 and 4 which in turn are mounted upon a base (not shown) in any suitable manner, but preferably the usual base having a foot lever with spring tension means for raising and lowering the uprights with the motor and head carried thereon by operation of the foot lever.

Figure 2:
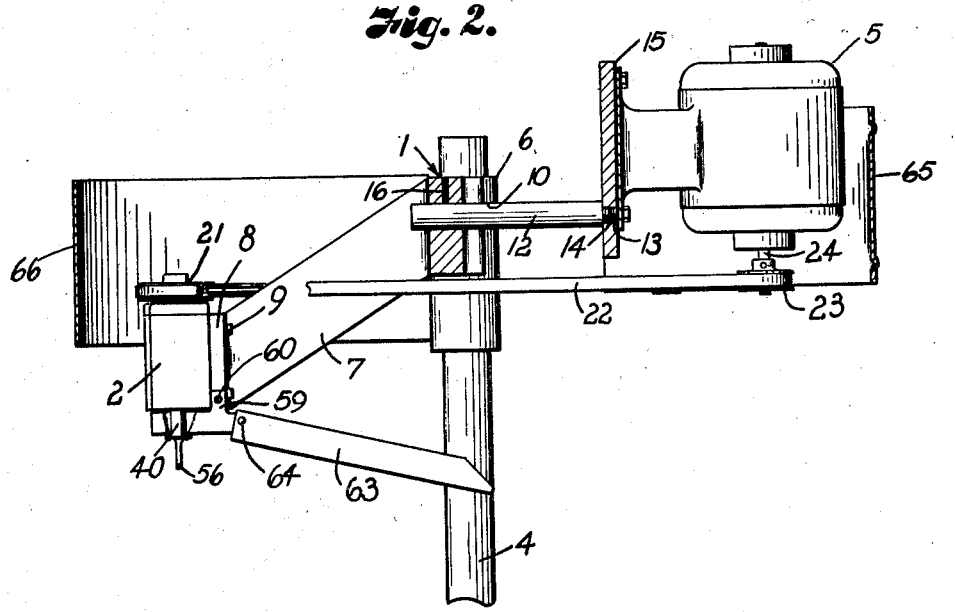
Fig. 2 is a view of our invention partly in cross section, taken on a line 2—2, Fig. 3.

A bracket or head member 6 is sleeved over the posts 3 and 4 and held thereon by suitable means such as set screws or the like (not shown). The bracket 6 includes an arm 7 extending outwardly and downwardly from one side thereof as best illustrated in Fig. 2 and is integrally formed with a plate 8 which in turn is secured to the head 2 by cap screws 9 or other suitable means.

Figure 3:
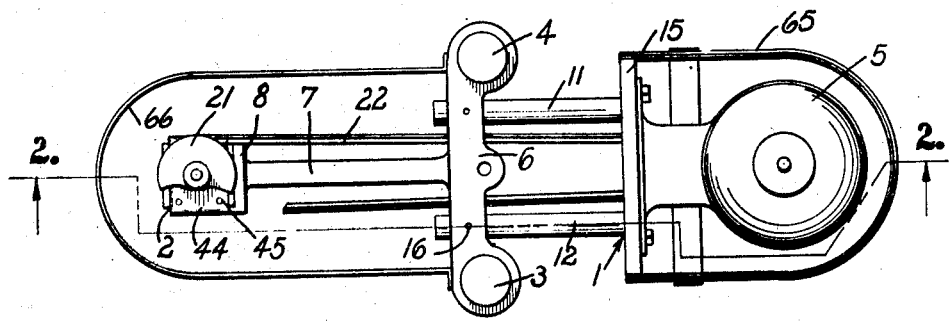
Fig. 3 is a plan view of our invention.
Figure 5:
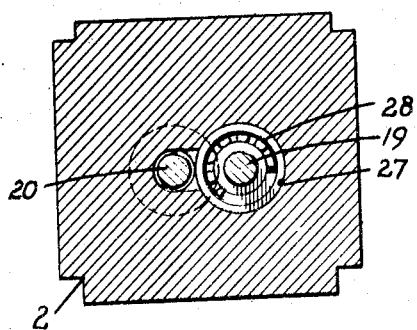
Fig. 5 is a cross-sectional view taken on a line 5—5, Fig. 4.

The bracket 6 is provided with spaced openings 10 adapted to receive rods 11 and 12 having threaded ends 13 engaging in openings 14 in a plate 15 for mounting of the motor 5 on the supports, the rods 11 and 12 being adjustable with respect to the bracket 6 by Allen or set screws 16 as illustrated in Fig. 3 for a purpose later described.

The drill head 2 is provided with spaced vertical bores 17 and 18 for receiving shafts 19 and 20 extending therethrough, the shaft 20 being longer than the shaft 19 and carrying a pulley wheel 21 on its upper end for accommodating a belt 22 leading to a pulley 23 on the shaft 24 of the motor 5 for operating the shafts 19 and 20 as will later appear. The pulley 21 is retained on the shaft 20 by a pin 25.

The upper end of the head 2 is recessed as indicated at 26, one side of which recess is extended further forming a socket 27 for accommodating a sealed anti-friction bearing 28 on the shaft 19. A gear 29 is provided on the upper end of shaft 19 which includes a boss 30 that is held on the shaft by a pin 31. A gear 32 is provided on the shaft 20 adapted to mesh with the gear 29 which is provided with a boss 33 and held on the shaft by a pin 34. The lower end of the head 2 is recessed as indicated at 35 one side of which is further recessed forming a socket 36 to accommodate a sealed anti-friction bearing 37 on the shaft 20. A sealed anti-friction bearing 38 engages in the recess 35 and is held in place on the shaft 19 by the shoulder 39 of an enlarged portion 40 of the shaft. A washer 41 is provided on the shaft 19 between the enlarged portion 40 and the bearing so as to engage the inner race of the bearing to take the thrust on the bearing as later described. It will be noted the shaft 20 has a circumferential flange 42 against which the inner race of the bearing 37 engages to take the thrust thereof. The flange also engages the outer race of the bearing 38 as indicated at 43, Fig. 4.

A retainer plate 44 is provided for engaging over the upper end of the head 2 and is held on the head by Allen screws 45 or the like. The plate 44 is recessed as indicated at 46 to accommodate a sealed anti-friction bearing 47 on the shaft 20. A sleeve 48 engages the upper end of the shaft 20 and the inner end engages against the inner race of the bearing 47 as indicated at 49 to retain the bearing in place. It will be noted the pin 25 engages through the sleeve as well as the boss of the pulley wheel 21 to retain the sleeve and pulley wheel on the shaft.

The lower end of the shaft 20 is also enlarged as indicated at 50 which provides a grooved or recessed portion 51 between the flange 42 and the enlarged portion to accommodate the friction bearing 38. It will thus be obvious that the bearings being offset with respect to each other on the respective shafts or, in other words, the bearings on one shaft being placed at different elevations with respect to those on the other shaft allows for a close proximation of the shafts one to the other.

The enlarged portions 40 and 50 on the lower end of the shafts 19 and 20 are integrally bored and tapered as indicated at 52 and 53, respectively and adapted to receive the tapered ends 54 and 55 of hollow drills 56 and 57, the drills being pressed into the tapered sockets as is the usual practice, and the lower ends being sharpened to form cutting surfaces also as is the usual practice.

A tray or pan 58 is provided for engaging around the enlarged heads 40 and 50 of the shafts and has ears 59 secured to the plate 8 of the bracket 6 by cap screws or the like 60. The enlarged portions 40 and 50 of the shafts have openings 61 and 62 connecting with the hollow portions thereof and with the hollow drills so that the cut-out paper portions or chips may carry upwardly through the drills 56 and 57 through the openings 61 and 62 into the pan 58. A chute 63 is secured to one side of the pan 58 as indicated at 64 to carry the chips away from the pan.

In order to prevent jamming of the chips in the openings 61 and 62 the insert portion 75 of the enlarged ends 40 and 50 of the shafts are curved as indicated at 76. The insert 75 is recessed as indicated at 77, 78 and 79 (Fig. 7) so that the chips from the tubular drills will contact the shoulders 80, 81 and 82 of the insert formed by said recesses and cause them to be broken apart so that they will pass through the openings 61 and 62 to the pan 58 and thence to the chute 63.

A guard 65 is provided around the motor and a guard 66 extends around the head 2 and encloses the belt 22 connecting the motor and shaft 20, the belt extending under the bracket 6 as shown in Fig. 2.

In assembling the shafts 19 and 20 in the head 2, the washer 41 is first placed over the shaft 19 and engages against the enlarged portion 40 of the shaft. The sealed bearing 38 is then placed over the shaft and the shaft extended through the bore 17 and into the recess portion 27 of the head, the bearing engaging in the recess 35. The bearing 28 is then placed on the shaft 19 and a washer or spacer 67 engages the inner race of the bearing 28. The gear 29 is then placed on the shaft and fastened in place by the pin 31.

The sealed bearing 37 is placed over the shaft 20 and the shaft 20 is then inserted through the bore 18 of the head 2 so that the bearing engages in the socket 36 of the recess 35 in the lower end of the head. The gear 32 is then placed over the shaft and engages in the recess portion 26 of the head and meshes with the gear 29, the gear 32 being held in place by the pin 34. The plate 44 is then secured to the top of the head 2 by the Allen screws 45 and the sealed bearing 47 placed on the shaft 20 and engaging in the recess portion 46. The sleeve 48 is then placed over the upper end of the shaft 20, the pulley 21 placed over the sleeve and the pulley and sleeve held thereon by the pin 25. A plate 68 is secured to the bottom of the pin 58 by screws or the like 69 and is provided with spaced openings to engage around the enlarged portions 40 and 50 of the lower ends of the shaft to hold the same in spaced relation and close the openings in the pan.

In operation of a device constructed and assembled as described, when it is desired to bore holes in a stack of paper placed upon a table (not shown) in proximity to the drills 56 and 57, the entire device including the head, motor and uprights is moved downwardly by a foot pedal (not shown) secured to a base upon which the uprights are mounted so that the drills 56 and 57 contact the paper and during such downward movement there will be upward thrust on the drill 56 which is transmitted from the drill through the washer 41 to the inner race of the bearing 38 which in turn is transmitted to the outer race of the bearing and to the shoulder 70 of the recess portion 35. Upward thrust on the drill 57 will be transmitted through the flange 42 to the inner race of the bearing 37 thence to the outer race of the bearing and to the shoulder 71 of the socket 36 of the recess 35.

Downward thrust on shaft 19 occurring when the drills are being removed from the paper stack will be against the gear 29 and transmitted through the washer or spacer 67 to the inner race of the bearing 28, thence to the outer race and against the shoulder 72 of the socket 27 of the recess 26. Downward thrust on the shaft 20 will be transmitted by the sleeve 48 to the inner race of the bearing 47, thence to the outer race and against the shoulder 73 in the recess 46 in the plate 44.

By adjustment of the rods 11 and 12 in the bracket 6 the motor 5 may be adjusted with respect to the bracket thereby tightening or loosening the belt 22.

It will be obvious from the foregoing that I have provided an improved boring head having shafts provided with bearings placed at different elevations on one shaft with respect to those on the other shaft so as to have the shafts closely together for drilling holes in close proximity and to provide such bearings with thrust portions with respect to the gears and head to eliminate wear on the moving parts.

What I claim and desire to secure by Letters Patent is:

1. In combination with a boring head for drilling paper having a plurality of shafts in laterally close relation and in axial parallelism and gears on said shafts, said shafts having enlarged heads on their lower ends provided with longitudinal bores and having inserts having channel openings aligning with the bores in said shafts, drills secured in said heads, the channels in said inserts being curved and forming longitudinal openings in one side of said heads, the curved portions forming shoulders in the heads, said drills having longitudinal openings therethrough aligning with the channels in the inserts and said drill openings being smaller than the channel openings in the sides of the heads forming a bottom in the channels intersecting the openings in the drills, a tray for chips cut from said paper, and means for securing the tray to said heads on the shafts, whereby chips cut from the paper stock by the drills forming rolls will pass through the openings in the drills and through the curved channels contacting the shoulders in the channels of the inserts and cause them to be broken apart to pass to said tray.

2. A device of the character described including a head having spaced longitudinal bores therethrough, a short shaft rotatable in one of said bores, a long shaft rotatable in the other bore, the respective ends of said head having recesses therein, said recesses including sockets, said sockets being offset from each other in the respective ends of the head, a bearing on the short shaft engaging in the recess on the lower end of the head, a bearing on said short shaft engaging in the socket in the recess in the upper end of the head, a bearing on the long shaft engaging in the socket in the recess in the lower end of the head, gears on said shafts engaging in the recess in the upper end of the head, the long shaft extending above said head, thrust means on the short shaft between the gear in the recess in the upper end of the head and the bearing in the socket in the recess in the upper end of the head, the long shaft having an annular flange near the lower end engaging the inner race of the bearing in the socket in said recess in the lower end of the head and engaging the outer race of the bearing on the short shaft in the lower recess, a plate secured to the top of said head and having an opening therein through which said long shaft extends, said plate having a socket surrounding said shaft, a bearing on said shaft engaging in said socket in said plate, and means for driving said long shaft for rotating the short shaft through said gears.

3. A device of the character described including a head having spaced longitudinal bores therethrough, a short shaft rotatable in one of said bores, a long shaft rotatable in the other bore, the respective ends of said head having recesses therein, said recesses including sockets, said sockets being offset from each other in the respective ends of the head, a bearing on the short shaft engaging in the recess on the lower end of the head, a bearing on said short shaft engaging in the socket in the recess in the upper end of the head, a bearing on the long shaft engaging in the socket in the recess in the lower end of the head, gears on said shaft engaging in the recess in the upper end of the head, the long shaft extending above said head, thrust means on the short shaft between the gear in the recess in the upper end of the head and the bearing in the socket in the recess in the upper end of the head, the long shaft having an annular flange near the lower end engaging the inner race of the bearing in the socket in said recess in the lower end of the head and engaging the outer race of the bearing on the short shaft in the lower recess, a plate secured to the top of said head and having an opening therein through which said long shaft extends, said plate having a socket surrounding said shaft, a bearing on said shaft engaging in said socket in said plate, means for driving said long shaft for rotating the short shaft through said gears, said shafts having enlarged heads on their lower ends provided with longitudinal bores and having inserts having channel openings aligning with the bores in said shafts, drills secured in said heads, the channels in said inserts being curved and forming longitudinal openings in one side of said heads, the curved portions forming shoulders in the heads, said drills having longitudinal openings therethrough aligning with the channels in the inserts and said drill openings being smaller than the channel openings in the sides of the heads forming a bottom in the channels intersecting the openings in the drills, a tray for chips cut from said paper, and means for securing the tray to said heads on the shafts, whereby chips cut from the paper stock by the drill forming rolls will pass through the openings in the drills and through the curved channels contacting the shoulders in the channels of the inserts and cause them to be broken apart to pass to said tray.

References Cited in the file of this patent

UNITED STATES PATENTS

| | | |
|---|---|---|
| 343,937 | Whitney | June 15, 1886 |
| 974,293 | Pignine | Nov. 1, 1910 |
| 2,190,259 | Custenborder | Feb. 13, 1940 |
| 2,248,441 | Shaw | July 8, 1941 |
| 2,253,153 | Trumble et al. | Aug. 19, 1941 |
| 2,264,786 | Barley et al. | Dec. 2, 1941 |
| 2,323,694 | Ward et al. | July 6, 1943 |
| 2,360,921 | Wiken | Oct. 20, 1944 |
| 2,434,732 | Alick | Jan. 20, 1948 |
| 2,615,525 | Berner | Oct. 28, 1952 |

FOREIGN PATENTS

| | | |
|---|---|---|
| 464,932 | Canada | May 9, 1950 |